United States Patent [19]

Ikushima et al.

[11] Patent Number: 5,311,375
[45] Date of Patent: May 10, 1994

[54] RECORDING HEAD ARRANGEMENT FOR VIDEO SIGNAL RECORDING AND/OR REPRODUCING DEVICE

[75] Inventors: Yoshiyuki Ikushima, Yaita; Taizo Sasada, Hirakata; Toshiaki Tabuchi, Nara, all of Japan

[73] Assignee: Sharp Kabushiki Kaisha, Osaka, Japan

[21] Appl. No.: 844,912

[22] Filed: Mar. 4, 1992

Related U.S. Application Data

[63] Continuation of Ser. No. 359,681, May 31, 1989, abandoned.

[30] Foreign Application Priority Data

May 31, 1988 [JP] Japan .................................. 63-134800

[51] Int. Cl.⁵ ......................... H04N 5/78; G11B 15/14
[52] U.S. Cl. .................................. 360/33.1; 360/9.1; 360/64
[58] Field of Search ............... 360/33.1, 84, 85, 76, 360/121, 124, 9.1, 64

[56] References Cited

U.S. PATENT DOCUMENTS

| | | | |
|---|---|---|---|
| 4,603,360 | 7/1986 | Fujiki et al. | 360/76 |
| 4,656,527 | 4/1987 | Uchimi | 360/36.2 |
| 4,730,222 | 3/1988 | Schauffele | 360/33.1 |
| 4,752,839 | 6/1988 | Lovely | 360/38.1 |
| 4,860,132 | 8/1989 | Lorteije | 360/124 |

FOREIGN PATENT DOCUMENTS

| | | |
|---|---|---|
| 0226796 | 11/1986 | European Pat. Off. |
| 0234483 | 2/1987 | European Pat. Off. |
| 55-30278 | 3/1980 | Japan ........................ 360/10.2 |

OTHER PUBLICATIONS

Video tape recorder 2nd edition by Harry Kybett p. 86, 1982.
SMPTE Journal, A View of the Signal Format Specification for the 4:2:2 Component Digital VTR, vol. 96, No. 12, Dec. 1987, White Plains, New York, pp. 1166-1172; J. Wilkinson.
Wideband Recording Technology for High-Definition Baseband VCR's IEEE Transactions on Consumer Electronics, vol. 33, No. 3, Aug. 1987, pp. 203-208; Itoga et al.

Primary Examiner—Andrew L. Sniezek
Assistant Examiner—Varsha V. Sheladia
Attorney, Agent, or Firm—Sandler Greenblum & Bernstein

[57] ABSTRACT

A recording head arrangement is disclosed which may be employed in a video signal recording and/or reproducing device in which a video tape is helically wound on a drum carrying recording heads for recording and/or reproducing a video signal. The video signal is divided for representing upper and lower half images on a screen. The recording head arrangement includes first and second heads mounted on the drum adjacent each other. The first and second heads have the same azimuth angle which is inclined in a first direction with respect to a direction perpendicular to the head advancing direction. Third and fourth heads are mounted on the drum 180 degrees spaced from the first and second heads, respectively. The third and fourth heads have the same azimuth angle which is inclined in a second direction, opposite to the first direction. The first and second heads are scanned to form first and second tracks spaced apart by approximately one track width for recording and/or reproducing the first half image, and the third and fourth heads are scanned to form third and fourth tracks spaced apart by approximately one track width and in an interlaced manner with the first and second tracks for recording and/or reproducing the second half image.

24 Claims, 4 Drawing Sheets

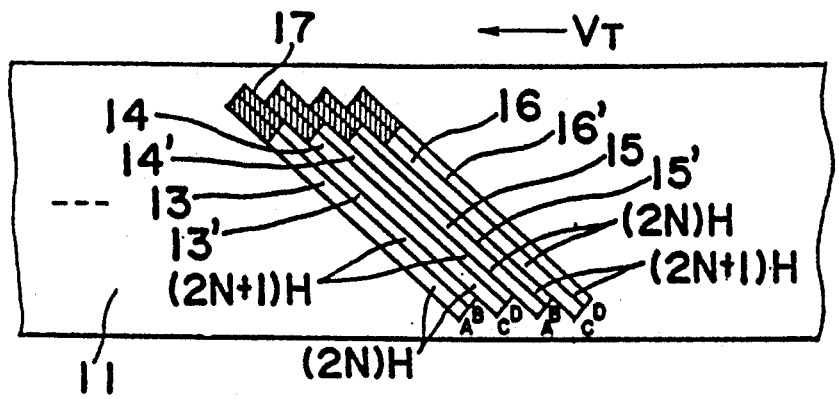
Fig. 1 PRIOR ART
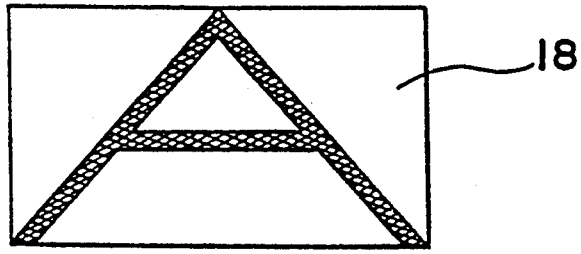
Fig. 2a PRIOR ART
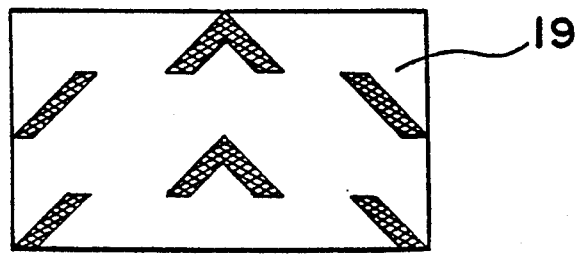
Fig. 2b PRIOR ART
Fig. 3 PRIOR ART
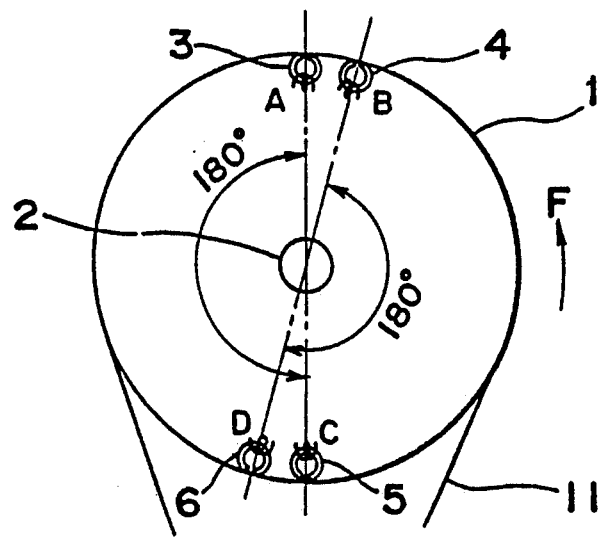

RECORDING HEAD ARRANGEMENT FOR VIDEO SIGNAL RECORDING AND/OR REPRODUCING DEVICE

This application is a continuation of application Ser. No. 07/359,681, filed May 31, 1989, now abandoned.

BACKGROUND OF THE INVENTION

1. Field of the Invention

The present invention relates to a video signal recording and/or reproducing device which magnetically records and reproduces a video signal, that is, a video tape recorder.

2. Description of the Prior Art and the Problems

A television video signal magnetic-recording device, that is, a video tape recorder is well-known device for producing and preserving a video signal. Recently, a video tape recorder using magnetic recording technology has increased in acceptance as a device to record and reproduce video signal, such as obtained from a television program, or video camera or from a package soft.

Recently, requirements for high quality pictures have become higher, and for this purpose, a high vividness TV form, that is, a high density television (hereinafter called HDTV) has been proposed, and some development of a video tape recorder for such HDTV has being proposed. However, HDTV uses a wide band signal range which is about 5 times as wide as the usual television signal band. Thus, a very fast signal transmission rate is required.

If the video tape recorder for the HDTV were to be made based on the conventional video tape recorder system, it is necessary to make the diameter of a rotary drum carrying recording heads by about five times as big, i.e., about 30 cm. Such a big size drum is not acceptable from the practical viewpoint.

To realize the recording of such a wide band signal, remarkable developments have been made on high density recording since the recent development of magnetic recording technology, such that the recording density is improved every year. For example, by using a newly developed recording medium, such as metallic tapes and metallic heads, the recording density has been improved greatly. Thus, the amount of medium used for recording a certain amount of data has been reduced due to many new developments.

However, a number of problems still remain due to the following reasons:

(1) For television broadcasting, the wide band video signal should be transferred and recorded on a real time basis;
(2) For accurately recording and reproducing the video signal in a wide band, it is necessary to increase the relative speed between the magnetic head and the recording medium;
(3) The speed of a revolution of rotary drum mounted with the magnetic head is limited to a certain speed due to mechanical and structural limitations; and
(4) The size of the rotary drum should preferably be smaller than a certain size for home use appliances, and from the viewpoint of mass-production.

The one segment recording (or non-segment recording) system in which one frame video signal is recorded on one track can not be realized. To overcome this problem, a two segment recording system has been proposed in which one frame is divided into two segments which are recorded on two tracks, one segment on each track. Alternately, a two channel recording system is also proposed in which the recording is effected two tracks at a time to prevent the deterioration of the transfer frequency reduction.

To determine which recording system should be used is very important because the track alignment determined by the selected recording system differs, and also consideration should be made on compatibility between different models and also on the effect of cross talk between neighboring tracks caused by the variation of head width.

FIG. 1 shows an example of a prior art track format employing a two segment recording system such that, for one field, four tracks are used, each of two heads scanned twice for recording two segments. According to this system, one picture frame is divided into upper and lower halves, each half being recorded on two tracks in parallel. With this system, the video signal can be reproduced to provide a proper image on the screen (FIG. 2a) at the ordinary reproducing speed, but at the high speed reproducing mode, the monitored video image on the screen will be doubled in upper and lower half portions of the screen (FIG. 2b) due to the separate recording of the video signal on the tape and also to the slant scanning of the magnetic head over the tape under the high speed reproducing mode.

In a magnetic recording and/or reproducing system, the difference in the azimuth angle between the recording head and the reproducing head gives rise to a reproduction loss shown by the following equation:

$$L = 20 \log \frac{\left(\frac{\pi w}{\lambda}\right)\tan\theta}{\sin\left(\left(\frac{\pi w}{\lambda}\right)\tan\theta\right)} \text{ (dB)}$$

in which, L is an azimuth loss, $\theta$ is an azimuth difference angle, W is the track width and $\lambda$ is the recording wavelength.

This equation shows that, provided that the azimuth difference in the same track width is the same, the shorter the wavelength, that is, the higher the frequency, the larger the azimuth loss generated.

An azimuth recording system has been developed in which the neighboring two tracks are recorded and reproduced with recording and reproducing heads having different azimuth angles. When this system is employed, the cross talk between the neighboring track is reduced.

Referring to FIG. 3, an example of a prior art magnetic head arrangement provided on drum 1 is shown. The rotary drum 1 rotates in a direction of arrow F. There are four magnetic heads 3, 4, 5 and 6, which are also referred to as A-head, B-head, C-head and D-head, mounted on drum 1 for recording and reproducing the video signal. A-head and C-head are positioned on opposite sides of center axis 2 and similarly B-head and D-head are positioned on opposite sides of center axis 2.

FIG. 4 shows an example of positions of A-head 3 and B-head 4. A head 3 and B head 4 have gaps 7 and 8, respectively, which are slanted in opposite directions at an azimuth angle $\theta$ with respect to a direction perpendicular to the head running direction indicated by arrowed G. C-head 5 and D-head 6 are arranged in the same manner.

In the example shown in FIG. 3, if rotary drum 1 has a diameter φ of 76 mm, with a revolution speed of 3,600 rpm, a tape applying angle of 180°+α=216° (α is a margin angle for voice signal area and head switching area), a tape feeding speed of 79.8 mm/sec, and a track width of 24.8 μm, a track pattern like the one shown in FIG. 1 will be formed on a magnetic tape 11.

That is, one frame is formed by 8 tracks, and picture information is divided into two segments for upper half and lower half of the screen image. The picture is also divided into a first field (even field) and a second field (odd field). Tracks 13 and 13' are used for the upper half of the first field, tracks 14 and 14' are used for the lower half of the first field, tracks 15 and 15' are used for the upper half of the second field, and tracks 16 and 16' are used for the lower half of the second field. In FIG. 1, N represents the divided order of the video signal. The voice signal is recorded on a PCM voice track 17.

The above track pattern, however, has the following problems. Since track 13 recorded by A-head 3 for the video signal of the upper half of the first field is located closely adjacent track 13' recorded by B-head 4 for the video signal of the upper half of the first field, a cross talk will be produced between tracks 13 and 13' in spite of the different azimuth angle, particularly for the low frequency range signal. Thus, the reproduced image will be deteriorated in C/N degradation of color signals, color blur or color irregularity. Although such a problem can be overcome by providing a space (guard band) between the tracks, this will not provide the high density recording.

In addition, when the video signal is recorded according to the pattern shown in FIG. 1, the reproduced picture on the screen will be proper (FIG. 2a) under the normal speed reproducing mode, but will be improper (FIG. 2b) under the double speed reproducing mode. Under a triple speed, or faster, reproducing mode, the picture will be utterly deformed.

SUMMARY OF THE INVENTION

The present invention has been made with a view to substantially solve the above-described disadvantages.

It is an object of the present invention to provide a recording head arrangement which will eliminate the effect of the cross talk between the neighboring tracks and which will provide a proper image even when a high speed reproducing mode is selected.

According to the present invention, a recording head arrangement is employed in a video signal recording and/or reproducing device in which a video tape is helically wound on a drum carrying recording heads for recording and/or reproducing a video signal which is so divided for representing upper and lower half images on a screen. The recording head arrangement includes first and second heads mounted on the drum adjacent each other. The first and second heads have the same azimuth angle which is inclined in a first direction with respect to a direction perpendicular to the head advancing direction. Also provided are third and fourth heads mounted on the drum 180 degrees spaced from the first and second heads, respectively. The third and fourth heads have the same azimuth angle which is inclined in a second direction, opposite to the first direction, with respect to the direction perpendicular to the head advancing direction. Thus, the first and second heads are scanned to form first and second tracks spaced by approximately one track width for recording and/or reproducing the first half image, and the third and fourth heads are scanning to form third and fourth tracks spaced by approximately one track width. These tracks are formed in an interlaced manner with the first and second tracks for recording and/or reproducing the second half image.

BRIEF DESCRIPTION OF THE DRAWINGS

These and other objects and features of the present invention will become apparent from the following description taken in conjunction with preferred embodiments thereof with reference to the accompanying drawings, throughout which like parts are designated by like reference numerals, and in which:

FIG. 1 is a diagrammatic view showing a track pattern on a magnetic tape according to the prior art; and FIGS. 2a and 2b are diagrammatic views showing an image formed on a screen.

FIG. 3 is a top plan view of a rotary drum of a prior art video signal recording and/or reproducing device;

DETAILED DESCRIPTION OF THE PREFERRED EMBODIMENT

Figure 4:
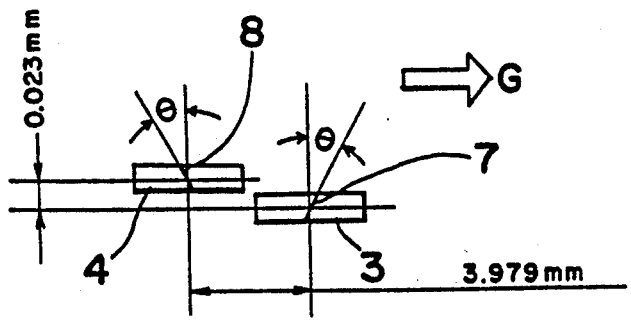
FIG. 4 is an expanded plan view of magnetic heads mounted in the rotary drum of FIG. 3.
Figure 5:
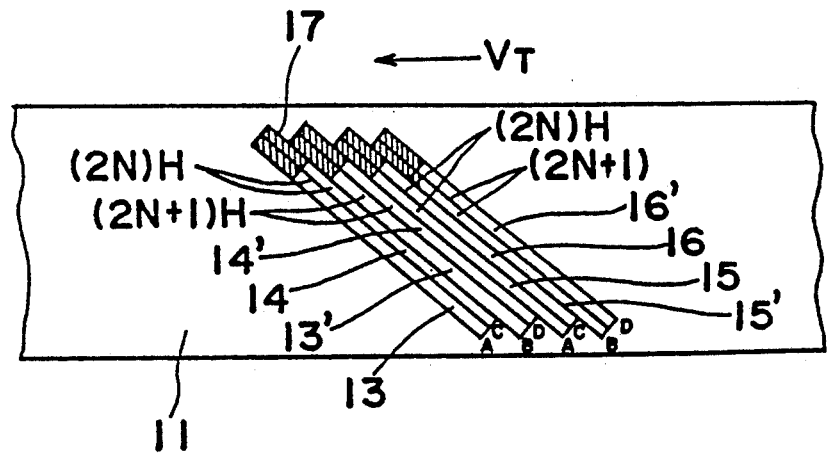
FIG. 5 is a diagrammatic view showing a track pattern on a magnetic tape according to a recording and/or reproducing device of the present invention.

Referring to FIG. 5, a track pattern formed by a magnetic head arrangement according to the present invention is shown. Since a track 13 recorded by A-head 3 is spaced from a track 13' recorded by B-head 4 by one track width, no cross talk will be observed between these two tracks 13 and 13'. Thus, without employing any guard band, sufficient C/N value can be obtained between the neighboring tracks, and therefore, a high quality reproduced picture with high density recording can be realized. In addition, even under the high speed reproducing mode, a proper image, as shown in FIG. 2a, can be obtained.

Figure 6:
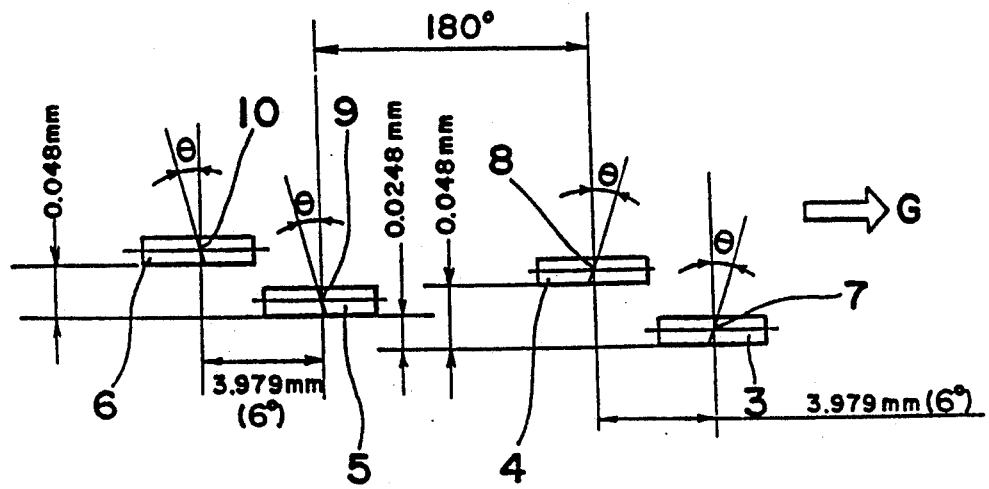
FIG. 6 is an expanded plan views of magnetic heads mounted in a rotary drum, according to the present invention.

Referring to FIG. 6, a manner in which the magnetic heads are mounted in the drum 1 is shown so as to provide the track pattern shown of FIG. 5.

As shown in FIG. 6, A-head 3 and B-head 4 are positioned closely adjacent each other with their center points spaced 3.979 mm (6°) in the head moving direction G and spaced 0.048 mm in the direction perpendicular to the direction G. Also, head gaps 7 and 8 have the same azimuth angle θ and are inclined in the same direction, i.e., in direction G with respect to a line perpendicular to direction G.

Similarly, still referring to FIG. 6, C-head 5 and D-head 6 are positioned closely adjacent each other with their center points spaced 3.979 mm in the head moving direction G and spaced 0.048 mm in the direction perpendicular to the direction G. Also, head gaps 9 and 10 have the same azimuth angle θ and are inclined in the same direction, i.e., in a direction opposite to direction G with respect to a line perpendicular to direction G.

Thus, head gaps 7 and 8 are inclined in one direction, and head gaps 9 and 10 are inclined in opposite direction.

It is to be noted that magnetic heads 3, 4, 5 and 6 are mounted on drum 1 as shown in FIG. 3 when viewed from the top.

Figure 7A:
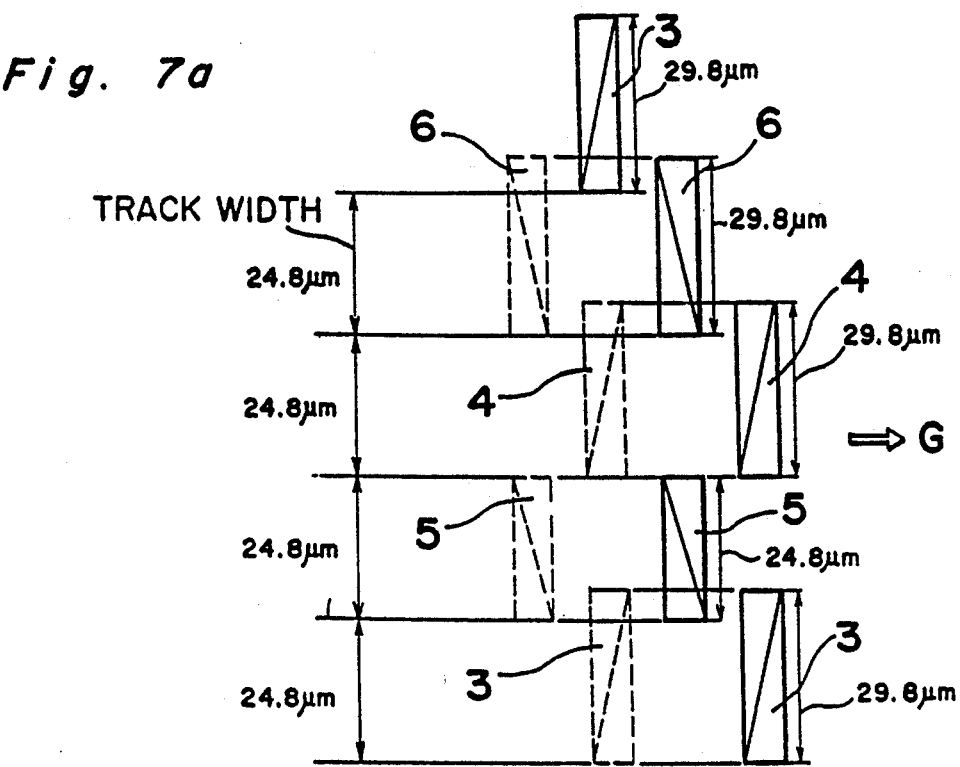
FIGS. 7a and 7b are diagrammatic views showing a relationship between recording heads and recorded tracks.

In FIG. 7a, a relationship between head track width and recording track width is shown when the recording heads of FIG. 6 are used. As shown in the figure, each recording track has a width of 24.8 $\mu$m. The recording tracks are formed such that, the recording tracks are first formed by A-head 3 and B-head 4 so that the formed tracks are spaced a little less than one track width, and thereafter, C-head 5 and D-head 6 are scanned to form tracks in the spaced areas. Thus, tracks formed by A-head 3 and B-head 4 are slightly overlapping with the track formed by D-head 6 at their sides. Similarly, tracks formed by A-head 3 and C-head 5 are slightly overlapping at their sides.

If the head track width and the recording track width are made the same, cross talk between the neighboring tracks can be reduced upon reproducing, but the tracking control becomes more difficult. Thus, during reproducing, if the head shifts off the track even by a very small amount, the head can not pick up all information recorded on the track. Thus, as shown in FIG. 7a, each head track width of A-head 3, B-head 4 and D-head 6 is made greater than the recording track width. For example, each head track has a width of 29.8 $\mu$m. C-head 5 has a width of 24.8 $\mu$m. When the level difference between A-head 3 and B-head 4 or between C-head 5 and D-head 6 is made approximately twice the track width, e.g., 48 $\mu$m, as shown in FIG. 6, the recording track width will be 24.8 $\mu$m with respect to the head arrangement of FIG. 6.

In FIG. 7a, dotted lines show positions of heads under the reproducing mode, in which each head follows the corresponding track with one edge of the head being aligned with one side of the recording track. With this arrangement, under the reproducing mode, due to the positioning error of the head during the manufacturing step, or due to unstable head scanning, heads can be easily pulled off from the recording track so that the recording track will not be completely traced by the head.

Figure 7B:
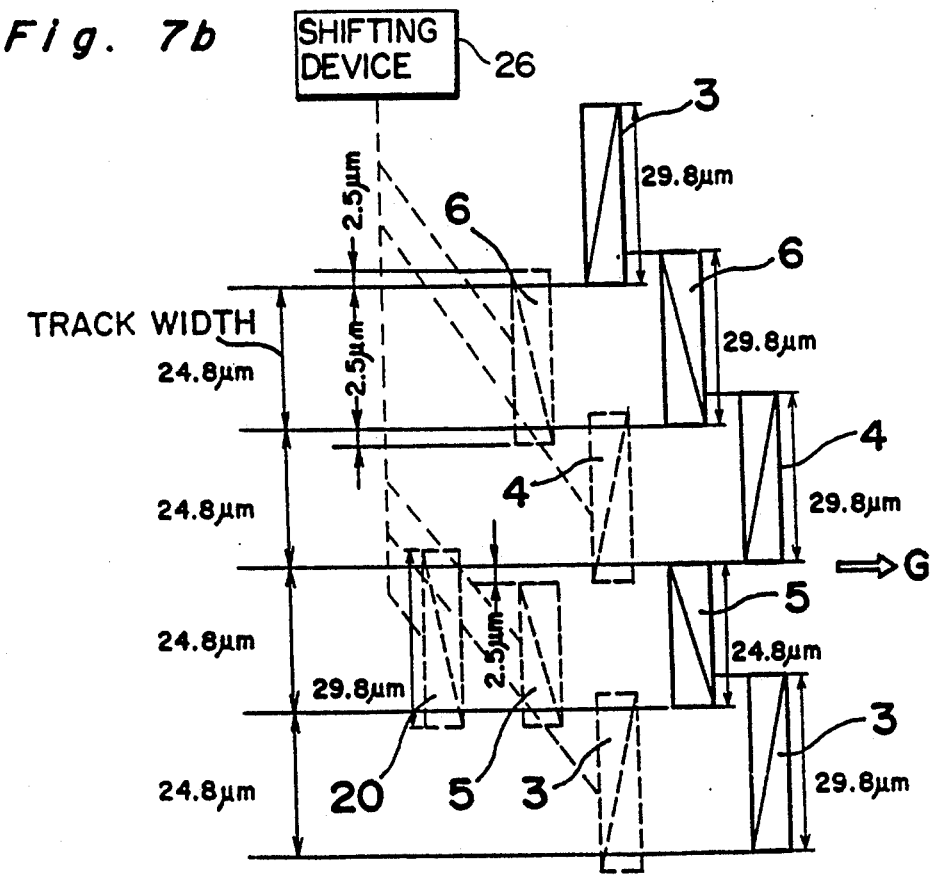

In order to overcome such a drawback, under the reproducing mode, head positions relative to the running tape are shifted by shifting device 26 and controlled to coincide to the center of the reproducing head with the center of the recording track, as shown in FIG. 7b. The control for maintaining the positions of the heads in the shifted position with respect to the recording tracks can be done by a known tracking control method. By this arrangement of FIG. 7b, even if the head is unintentionally shifted during the reproducing mode, the head will still completely cover the recording track. In this case, the off track limit of the head is $(29.8-24.8)/2=2.5$ $\mu$m.

Figure 8:
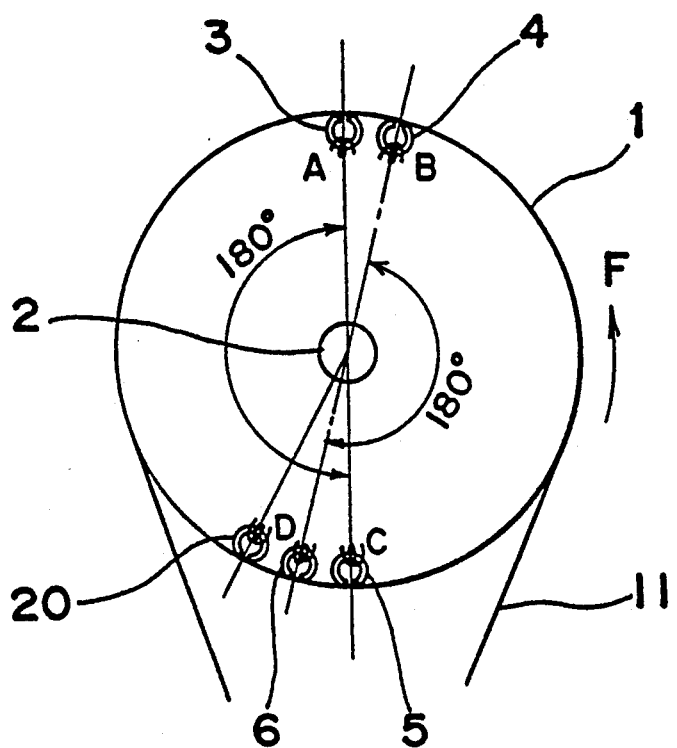
FIG. 8 is a top plan view of a rotary drum according to another embodiment of the present invention.
Figure 9:
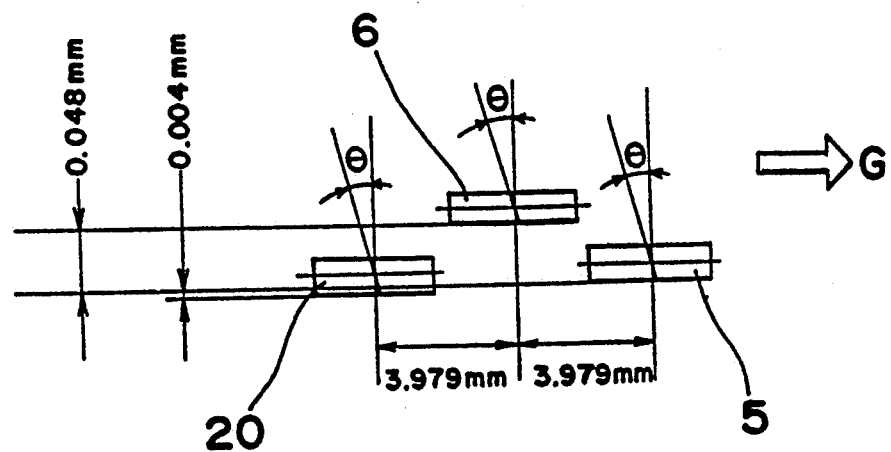
FIG. 9 is an expanded plan view of magnetic heads mounted in the rotary drum of FIG. 8.

Since C-head 5 has a width of 24.8 $\mu$m which is equal to the width of the recording track, the shifting of C-head 5 during the reproducing mode, in the same manner as the rest of the heads, will result in a continuous off track condition of C-head 5, as shown in FIG. 7b. To solve this problem, an auxiliary C-head 20, used only for reproducing, having a head width of 29.8 $\mu$m is provided such that the center of the auxiliary C-head 20 coincides with the center of the recording track. On the rotary drum 1, as shown in FIGS. 8 and 9, the auxiliary C-head 20 is positioned adjacent D-head 6, and slightly (4 $\mu$m) below the level of C-head 5.

According to the present invention, since video signals are divided into first signals representing the upper half image and second signals representing lower half image on the screen, the first signals are recorded on two tracks with the same azimuth angle, and the second signals are recorded on two tracks with an azimuth angle different from the first mentioned azimuth angle. Furthermore, the tracks for the first signals and the tracks for the second signals are interlaced so that the neighboring two tracks have a different azimuth angle. Thus, by the present invention, the cross talk between the neighboring tracks can be reduced, and a proper and stable image can be reproduced not only during a normal speed reproducing mode, but also during a high speed reproducing mode.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims.

What is claimed is:

1. A recording head arrangement employed in a video signal recording and/or reproducing device in which a video tape is helically wound on a drum carrying recording heads for recording and/or reproducing a video signal which is so divided for representing first and second half images on a screen, said recording head arrangement comprising:

a first head mounted on said drum, said first head having an azimuth angle inclined in a first direction with respect to a direction perpendicular to a head advancing direction;

a second head mounted on said drum closely adjacent said first head, said second head having an azimuth angle inclined in said first direction;

a third head mounted on said drum 180 degrees spaced from said first head, said third head having an azimuth angle inclined in a second direction, opposite to said first direction, with respect to the direction perpendicular to the head advancing direction; and a fourth head mounted on said drum closely adjacent said third head and 180 degrees spaced from said second head, said fourth head having an azimuth angle inclined in said second direction;

whereby said first and second heads are scanned to form first and second tracks spaced by approximately one track width for recording and/or reproducing said first half image, and said third and fourth heads are scanned to form third and fourth tracks spaced by approximately one track width and in an interlaced manner with said first and second tracks for recording and/or reproducing said second half image;

said first, second, and fourth heads having a width, along a direction perpendicular to the head advancing direction, which is larger than a width of said third head, wherein the width of said third head is equal to the width of each of said tracks.

2. A recording head arrangement as claimed in claim 1, wherein said first, second, and fourth heads have the same width.

3. A recording head arrangement as claimed in claim 2, further comprising a fifth head mounted on said drum closely adjacent said fourth head, said fifth head having an azimuth angle inclined in said second direction, and being used for reproducing said video signal.

4. A recording head arrangement as claimed in claim 3, wherein said fifth head has a width equal to the width of said first, second, and fourth heads.

5. A recording head arrangement as claimed in claim 1, wherein the combination of said first, second, third and fourth tracks comprise a single field, and wherein two fields comprise one frame.

6. A recording head arrangement as claimed in claim 1, wherein said arrangement further comprises means for rotating said drum at one of two speeds, said two speeds comprising a normal speed and a fast speed which is equal twice said normal speed, and wherein, when said rotating means rotates said drum at said fast speed for one-half rotation, said first head traverses four tracks.

7. A recording head arrangement as claimed in claim 1, further comprising means for controlling tracking of the video tape, said means for controlling comprising:
means for shifting the position of said first, second, third, and fourth heads to another position and maintaining the position of said first, second, third, and fourth heads at said another position during reproduction of signals from the video tape.

8. A recording head arrangement as claimed in claim 7, wherein said means for shifting aligns said first, second, and fourth heads so that a center axis of each of said first, second, and fourth heads is aligned with a center axis of a corresponding track.

9. A recording head arrangement as claimed in claim 8, further comprising a fifth head having a width larger than the width of said third head, said fifth head being positioned by said means for shifting, so that a center axis of said fifth head is aligned with a center axis of a corresponding track.

10. A recording head arrangement as claimed in claim 7, further comprising a fifth head having a width which is greater than the width of said third head.

11. A recording head arrangement as claimed in claim 10, wherein said fifth head has a width equal to the width of said first, second, and fourth heads.

12. The recording head arrangement as claimed in claim 1, comprising means for scanning said third and fourth heads subsequent to scanning said first and second heads.

13. A recording head arrangement employed in a video signal recording and/or reproducing device in which a video tape is helically wound on a drum carrying recording heads for recording and/or reproducing a video signal which is so divided for representing first and second half images on a screen, said recording head arrangement comprising:
a first head mounted on said drum, said first head having an azimuth angle inclined in a first direction with respect to a direction perpendicular to a head advancing direction;
a second head mounted on said drum closely adjacent said first head, said second head having an azimuth angle inclined in said first direction;
a third head mounted on said drum 180 degrees spaced from said first head, said third head having an azimuth angle inclined in a second direction, opposite to said first direction, with respect to the direction perpendicular to the head advancing direction; and
a fourth head mounted on said drum closely adjacent said third head and 180 degrees spaced from said second head, said fourth head having an azimuth angle inclined in said second direction;
whereby said first and second heads are scanned to form first and second tracks spaced by approximately one track width for recording and/or reproducing said first half image, and said third and fourth heads are scanned to form third and fourth tracks spaced by approximately one track width and in an interlaced manner with said first and second tracks for recording and/or reproducing said second half image;
said first, second, and fourth heads having a width, along a direction perpendicular to the head advancing direction, which is larger than a width of said third head;
said recording head arrangement further comprising means for scanning said third head such that said third track partially overlaps said first track, thereby rendering the track pitches of said first and third tracks substantially equal to one another.

14. The recording head arrangement as claimed in claim 13, comprising means for scanning said fourth head such that said fourth track partially overlaps said second track, thereby rendering the track pitch of said second track substantially equal to the track pitch of said first and third tracks.

15. A recording head arrangement as claimed in claim 13, wherein said first, second, and fourth heads have the same width.

16. A recording head arrangement as claimed in claim 15, further comprising a fifth head mounted on said drum closely adjacent said fourth head, said fifth head having an azimuth angle inclined in said second direction, and being used for reproducing said video signal.

17. A recording head arrangement as claimed in claim 16, wherein said fifth head has a width equal to the width of said first, second, and fourth heads.

18. A recording head arrangement as claimed in claim 13, further comprising means for controlling tracking of the video tape, said means for controlling comprising:
means for shifting the position of said first, second, third, and fourth heads to another position and maintaining the position of said first, second, third, and fourth heads at said another position during reproduction of signals from the video tape.

19. A recording head arrangement as claimed in claim 18, wherein said means for shifting aligns said first, second, and fourth heads so that a center axis of each of said first, second and fourth heads is aligned with a center axis of a corresponding track.

20. A recording head arrangement as claimed in claim 19, further comprising a fifth head having a width larger than the width of said third head, said fifth head being positioned by said means for shifting, so that a center axis of said fifth head is aligned with a center axis of a corresponding track.

21. A recording head arrangement as claimed in claim 19, wherein the width of said third head is equal to the width of each of said tracks.

22. A recording head arrangement as claimed in claim 18, further comprising a fifth head having a width which is greater than the width of said third head.

23. A recording head arrangement as claimed in claim 22, wherein said fifth head has a width equal to the width of said first, second, and fourth heads.

24. A recording head arrangement as claimed in claim 13, wherein the width of said third head is equal to the width of each of said tracks.

* * * * *